(12) United States Patent
Svedman et al.

(10) Patent No.: US 11,324,053 B2
(45) Date of Patent: May 3, 2022

(54) CO-EXISTENCE OF DIFFERENT RANDOM ACCESS RESOURCES AND ASSOCIATIONS

(71) Applicant: ZTE Corporation, Guangdong (CN)

(72) Inventors: Patrick Svedman, Chevy Chase, MD (US); Junfeng Zhang, Guangdong (CN); Peng Hao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 119 days.

(21) Appl. No.: 16/766,663

(22) PCT Filed: Nov. 22, 2017

(86) PCT No.: PCT/CN2017/112328
§ 371 (c)(1),
(2) Date: May 22, 2020

(87) PCT Pub. No.: WO2019/100254
PCT Pub. Date: May 31, 2019

(65) Prior Publication Data
US 2021/0352734 A1 Nov. 11, 2021

(51) Int. Cl.
*H04W 74/02* (2009.01)
*H04W 74/08* (2009.01)
*H04W 72/12* (2009.01)

(52) U.S. Cl.
CPC ... *H04W 74/0841* (2013.01); *H04W 72/1263* (2013.01); *H04W 74/02* (2013.01)

(58) Field of Classification Search
None
See application file for complete search history.

(56) References Cited

U.S. PATENT DOCUMENTS

| 8,681,765 B2 * | 3/2014 | Kwon | H04W 74/02 370/345 |
| 2012/0263137 A1 * | 10/2012 | Walton | H04W 74/0816 370/329 |

(Continued)

FOREIGN PATENT DOCUMENTS

| CN | 102685892 A | 9/2012 |
| CN | 103096489 A | 5/2013 |

(Continued)

OTHER PUBLICATIONS

Office Action for Korean Patent Application No. 10-2020-7018068, dated May 21, 2021 (7 pages).

(Continued)

*Primary Examiner* — Kodzovi Acolatse
(74) *Attorney, Agent, or Firm* — Perkins Coie LLP

(57) ABSTRACT

Enabling the co-existence of contention based random access (CBRA) and contention free random access (CFRA) is an effective technique to improve network flexibility and usage of network resources. In some embodiments, all available communication opportunities in the CBRA schedule and all available communication opportunities in the CFRA schedule may be used to generate a final schedule Different subsets of preamble indices are employed to ensure that both CBRA and CFRA communications can co-exist. In other embodiments, all available communication opportunities in the CBRA schedule, but only the dedicated communication opportunities in the CFRA schedule, may be used to generate a final schedule. As a result, a smaller subset of preamble indices is used.

31 Claims, 7 Drawing Sheets

(56) References Cited

U.S. PATENT DOCUMENTS

| | | | | |
|---|---|---|---|---|
| 2015/0372996 | A1* | 12/2015 | Schrum, Jr. | H04L 67/322 713/171 |
| 2016/0174237 | A1* | 6/2016 | Zhao | H04W 72/10 370/329 |
| 2016/0302235 | A1* | 10/2016 | Hwang | H04W 74/08 |
| 2017/0013565 | A1* | 1/2017 | Pelletier | H04W 52/365 |
| 2017/0290050 | A1* | 10/2017 | Yun | H04W 74/002 |
| 2017/0366463 | A1* | 12/2017 | Katar | H04B 3/542 |
| 2018/0324653 | A1* | 11/2018 | Nagaraja | H04W 36/0044 |
| 2019/0174571 | A1* | 6/2019 | Deenoo | H04W 76/11 |
| 2020/0154326 | A1* | 5/2020 | Deenoo | H04W 24/08 |
| 2020/0351853 | A1* | 11/2020 | Xiong | H04L 5/0023 |
| 2020/0373990 | A1* | 11/2020 | Da Silva | H04W 74/0833 |

FOREIGN PATENT DOCUMENTS

| | | |
|---|---|---|
| CN | 105101454 A | 11/2015 |
| CN | 106162924 A | 11/2016 |
| CN | 109076589 A | 12/2018 |
| KR | 10-2012-0051055 A | 5/2012 |
| KR | 10-2012-0140110 A | 12/2012 |
| WO | 2014/017966 A1 | 1/2014 |
| WO | 2014017966 A1 | 1/2014 |
| WO | 2017/028644 A1 | 2/2017 |
| WO | 2017/195815 A1 | 11/2017 |

OTHER PUBLICATIONS

First Examination Report for Indian Patent Application No. 202047026160, dated Jun. 26, 2021 (5 pages).

Nokia et al., "Beam Recovery in NR," 3GPP TSG-RAN WG1 meeting #91, Reno, Nevada, R1-1720891, 6 pages, Nov. 2017.

Extended European Search Report for European Patent Application No. 17932902.4, dated Oct. 16, 2020.

International Search Report and Written Opinion dated Aug. 9, 2018 for International Application No. PCT/CN2017/112328, filed on Nov. 22, 2017 (6 pages).

Sharp, "Remaining issue on RACH preambles in NR," 3GPP TSG RAN WG1 Meeting 91, Reno, Nevada, USA, R1-1720611, 7 pages, Dec. 2017.

Office Action for Chinese Patent Application No. 201780097144.5, dated Sep. 3, 2021 (29 pages).

* cited by examiner

CO-EXISTENCE OF DIFFERENT RANDOM ACCESS RESOURCES AND ASSOCIATIONS

CROSS REFERENCE TO RELATED APPLICATIONS

This patent document is a U.S. national stage application under 35 U.S.C. 371 and claims benefit of priority of International Patent Application No. PCT/CN2017/112328, filed on Nov. 22, 2017. The entire content of the before-mentioned patent application is incorporated by reference as part of the disclosure of this application.

TECHNICAL FIELD

This document is directed generally to wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

SUMMARY

This document relates to methods, systems, and devices for the co-existence of contention based random access (CBRA) and contention free random access (CFRA) resources and associations between a user equipment (UE) and radio access node or base station (BS), with relevance to Long Term Evolution (LTE) and New Radio (NR) cellular networks.

In one exemplary aspect, a wireless communication method is disclosed. The wireless communication method comprises obtaining a first configuration for a first type of communication, wherein the first configuration comprises a first schedule, obtaining a second configuration for a second type of communication, wherein the second configuration comprises a second schedule and an indication, generating a third schedule based on the first schedule and the second schedule using one of a plurality of procedures, wherein the one of the plurality of procedures is selected based on the indication, and communicating, based on the third schedule, using at least one of the first and second types of communication.

In another exemplary aspect, a wireless communication method is disclosed. The wireless communication method comprises generating a first configuration for a first type of communication, wherein the first configuration comprises a first schedule, generating a second configuration for a second type of communication, wherein the second configuration comprises a second schedule and an indication, generating a third schedule based on the first schedule and the second schedule using one of a plurality of procedures, wherein the one of the plurality of procedures is selected based on the indication, transmitting the first configuration, transmitting the second configuration comprising the indication, and scheduling and communicating based on the third schedule.

In yet another exemplary aspect, a wireless communication base station is disclosed. The wireless communication base station comprises a processor that is configured to execute instructions to cause the base station to generate a first configuration for a first type of communication, wherein the first configuration comprises a first schedule, generate a second configuration for a second type of communication, wherein the second configuration comprises a second schedule and an indication, generate a third schedule based on the first schedule and the second schedule using one of a plurality of procedures, wherein the one of the plurality of procedures is selected based on the indication, transmit the first configuration, transmit the second configuration comprising the indication, and schedule and communicate based on the third schedule.

In yet another exemplary aspect, a wireless communication mobile station is disclosed. The wireless communication mobile station comprises a processor that is configured to cause the mobile station to obtain a first configuration for a first type of communication, wherein the first configuration comprises a first schedule, obtain a second configuration for a second type of communication, wherein the second configuration comprises a second schedule and an indication, generate a third schedule based on the first schedule and the second schedule using one of a plurality of procedures, wherein the one of the plurality of procedures is selected based on the indication, and communicate, based on the third schedule, using at least one of the first and second types of communication.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

A fundamental procedure in any cellular system is the random access procedure, which enables a mobile terminal to contact the network in an unsynchronized manner. This non-synchronous communication from the UE to the BS is typically implemented on a Physical Random Access Channel (PRACH), according to particular preamble formats, based on the specific standard under consideration. A time-frequency resource reserved for a random access transmission by the UE according to a PRACH preamble format is denoted as a PRACH occasion or PRACH communication opportunity. In the context of LTE or NR cellular networks, PRACH may be referred to as Message 1 (Msg. 1). In some embodiments, it is assumed that CBRA is always configured in a cell and that CFRA can be UE-specifically configured.

Figure 1:
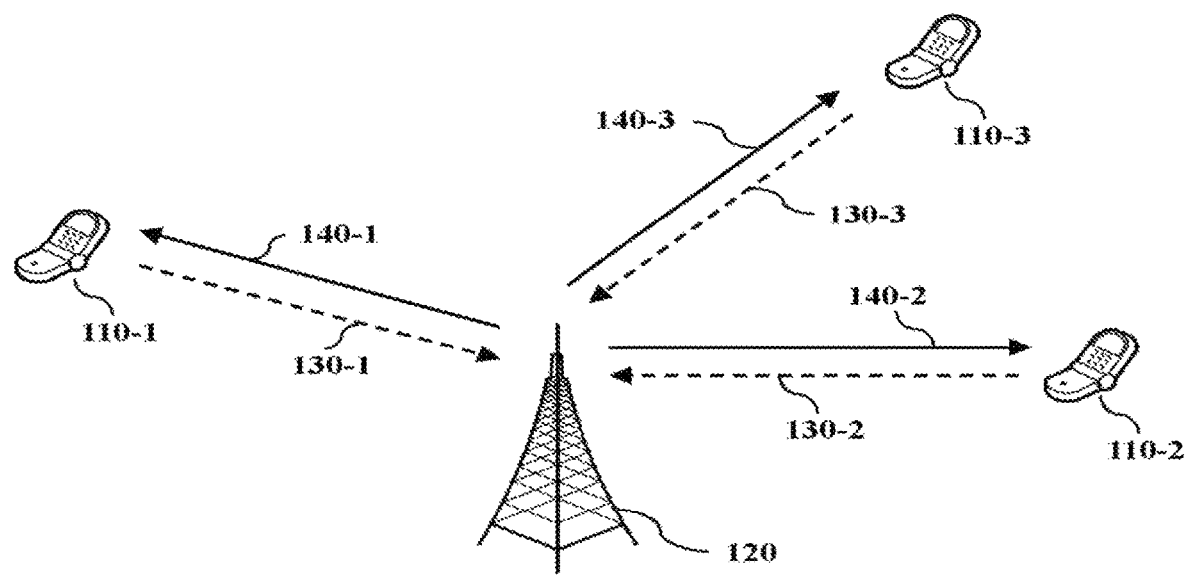
FIG. 1 shows an example of a base station (BS) and user equipment (UE) in wireless communication, in accordance with some embodiments of the presently disclosed technology.

FIG. 1 shows an example of a base station (BS) and UEs in wireless communication, in accordance with some embodiments of the presently disclosed technology. In an embodiment, the base station 120 transmits CBRA and CFRA configurations (140-1 to 140-3) to the respective UEs (110-1 to 110-3). The CBRA and CFRA configurations may contain schedules of PRACH communication opportunities for the UEs. The PRACH_CBRA occasions and the PRACH_CFRA occasions are reconciled by each UE to generate a final schedule, based on which the UEs may randomly access the physical channel (130-1 to 130-3).

By supporting various ways to generate a final schedule, a more flexible use of CFRA can be supported. Since the final schedule can be used to generate associations between downlink signals (e.g. SS/PBCH blocks) and PRACH occasions, a flexible generation of CFRA PRACH pattern allows flexible associations. This can be useful to support the cases that different signals are used for CBRA and CFRA associations, different PRACH parameters are applied to CBRA and CFRA resources or that a preamble index used for CBRA in CBRA occasions can be assigned to CFRA in CFRA resources that don't overlap with CBRA resources.

CBRA Resource (PRACH) Configuration A PRACH slot describes the time domain resources used for PRACH.

In an example, the 3GPP standard may base the slot duration for PRACH resource mapping for short preamble formats (e.g., L=139) on the RACH Msg1 numerology, e.g. the subcarrier spacing (SCS), and may further base the slot duration for PRACH resource mapping for long preamble formats (e.g., L=839) on 15 kHz SCS.

A pattern of PRACH occasions with a time interval T1 can be configured. In an embodiment, the pattern in T1 is referred to as a PRACH burst, which can be configured with a number of parameters including one or more of:
 PRACH preamble format;
 PRACH sequence length;
 High Speed Flag;
 Root sequence index;
 Zero Correlation Zone Config;
 Time domain pattern of PRACH slots;
 Time domain pattern of PRACH occasions;
 Density of PRACH occasions or PRACH slots in T1;
 Periodicity of PRACH occasions or PRACH slots in T1;
 Starting symbol in slot, e.g. in PRACH slot;
 Ending symbol in slot, e.g. in PRACH slot;
 PRACH subcarrier spacing (e.g. 0.5 kHz, 0.625 kHz, 1.25 kHz, 5 kHz, 15 kHz, 30 kHz, 60 kHz, 120 kHz, 240 kHz);
 Frequency offset;
 The number of frequency-multiplexed PRACH occasions; and
 One or more other parameters that define a pattern of PRACH occasions.

The pattern of PRACH occasions spans time and/or frequency in various embodiments. In an embodiment, a pattern of PRACH occasions is fully or partly (e.g. only the time-domain part of the pattern) represented by a pattern of PRACH slots. A PRACH slot is a pattern of PRACH occasions within a slot, where the slot consists of a number of symbols, e.g. 7 or 14 symbols in a particular numerology (including subcarrier spacing, symbol duration, etc.). For example, the numerology is the numerology used by the downlink synchronization signal(s), the numerology of PRACH, the numerology of message 2 (Msg.2, also called random access response (RAR)) or the numerology of message 3 (Msg.3), the numerology of remaining minimum system information (RMSI), or a specified numerology based on the sequence length (e.g. 15 kHz numerology if the sequence length is 839). In various embodiments, RMSI is used to deliver system information block 1 (SIB1).

In some embodiments, the pattern is configurable, whereas in other embodiments it is fixed as defined in a technical specification. In yet other embodiments, the pattern is partly configurable and partly fixed as per a specification, and may be configured by using one or more tables. In such a table, columns can represent pattern parameters, for example for a subset of those enumerated above. A pattern can then be fully or partly indicated by a PRACH config index, which would indicate one row in the table. In some embodiments, some parameters are explicitly configured, e.g. a subset of those in the bullets above. For simplicity, let PRACH_burst_config denote the configuration of a pattern of PRACH occasions within T1. In various embodiments, PRACH_burst_config consists of PRACH config index and/or combinations of explicit parameters, e.g. as enumerated above. In some embodiments, PRACH_burst_config contains multiple indices for different tables, which each configures a combination of parameters.

In various embodiments, the configuration of a pattern of PRACH occasions is included in SIB1 and/or RMSI.

For example, and in the case of the 3GPP New Radio (NR), patterns of slots of PRACH resources may be configured as described below:
 (a) The pattern of the slots that contain PRACH resource(s) may be defined in to a larger time interval, and could be based on a time interval of 5/10/20 msec, the pattern, and the numerology of the slot, e.g. SS/PBCH block, UL/DL, Msg1 or PUSCH,
 (b) The PRACH resources within a slot may be consecutive (Alt1) or they may be non-consecutive (Alt2), e.g. to handle the case of CORESET monitoring, in the 2/4/7 symbols,
 (c) PRACH configurations may be specified using a table similar to LTE, and this table may be indexed by the PRACH Config Index,
 (d) Frequency multiplexed PRACH transmission occasions use the same PRACH Config Index, and
 (e) the New Radio attempts to minimize the number of bits needed for the RACH configuration by (i) using 8-bits as the starting point, and (ii) considering whether SCS and formats are part of the table.

Figure 2:
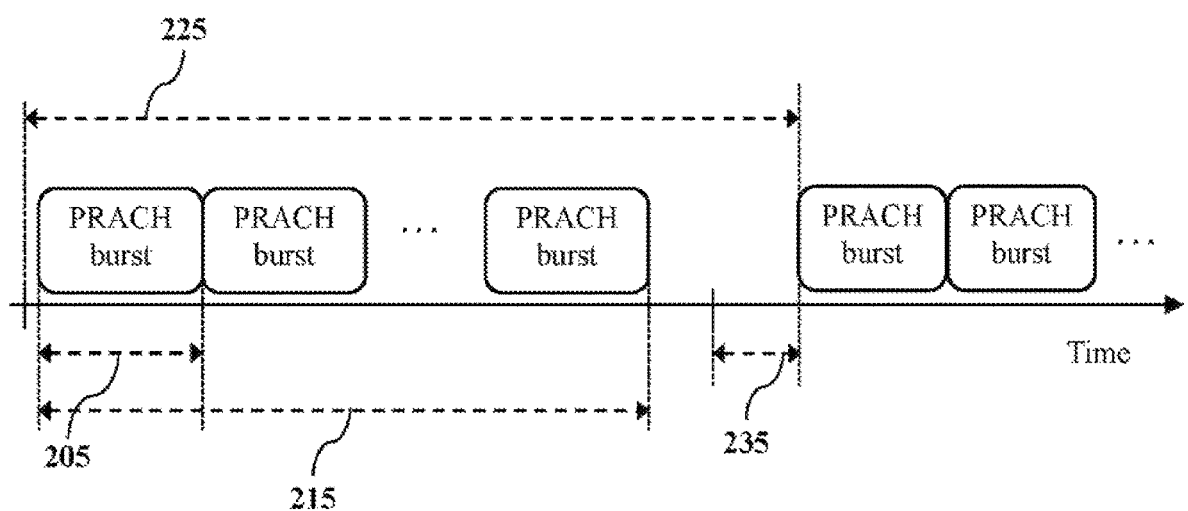
FIG. 2 shows the parameters that define Physical Random Access Channel (PRACH) occasions in the time domain, in accordance with some embodiments of the presently disclosed technology.

In addition to the PRACH occasion pattern within the time interval T1, the other parameters that define Physical Random Access Channel (PRACH) occasions in the time domain, as shown in FIG. 2, could be used to specify PRACH occasions. In some embodiments, and as shown in FIG. 2, these additional parameters include the number of consecutive PRACH bursts per burst set (N; 215), the PRACH burst set time offset (D; 235) and the PRACH burst set periodicity (P; 225).

In some embodiments, a PRACH burst is of the duration T1 (205) and the pattern within one PRACH burst is defined by a pattern of PRACH occasions, as discussed above, for example by using a PRACH config index. In other embodiments, the duration of the PRACH burst set is N*T1, where N is configurable. The PRACH burst set periodicity (225) may be an integer number of T1 or an integer number of N*T1 or defined in milliseconds (ms).

The PRACH burst set time offset (235) may be an integer number of T1 or defined in msec, and/or in reference to some reference timing, e.g. SFN mod P=0 or a half frame with SS/PBCH blocks (SS burst set). In some embodiments, the PRACH burst set periodicity (225) is called "RACH Configuration Period". In other embodiments, the PRACH burst duration T1 can be fixed in the specification, for example to be 5, 10 or 20 ms. In some embodiments, the PRACH burst duration T1 depends on the numerology, for example one the numerologies described above to obtain the PRACH slot numerology.

It is beneficial to support a flexible configuration of PRACH occasions, since it allows the network adaption of PRACH occasions to the scenario and situation, e.g. the PRACH load and the network deployment and implementation. Without a flexible PRACH occasion configuration, radio resources may be wasted, resulting in deteriorated UE and network performance.

The embodiments described above may be used to configure CBRA PRACH occasions in RMSI. To clarify that the parameters configure the CBRA, the example parameters are given the _CBRA suffix. In other words: PRACH_burst_config_CBRA, N_CBRA, D_CBRA, and P_CBRA are configured in RMSI in various embodiments and with UE-specific signaling, e.g. handover command, in other embodiments.

The PRACH_burst_config configures the pattern of PRACH occasions within T1. For simplicity, let RO_CBRA denote the set of parameters (i.e. the configuration) to configure CBRA PRACH occasions. For example, RO_CBRA={PRACH_burst_config_CBRA, N_CBRA, D_CBRA, P_CBRA}. In various embodiments, one or more of N_CBRA, D_CBRA, P_CBRA are fixed in a specification. For example, N=1, D=one T1, D=two T1, P=20 ms, P=40 ms, P=80 ms and/or P=160 ms in various combinations.

In some embodiments, a set of patterns of PRACH bursts within a period P (fixed or configurable) is defined in a table. In some embodiments, also P is configured in the table. The pattern of PRACH occasions within a period P can then be configured by:

(i)  RO_CBRA={PRACH_burst_config_CBRA, PRACH_ burst_pattern_CBRA}, or (ii) RO_CBRA={PRACH_burst_config_CBRA, PRACH_burst_pattern_CBRA, P_CBRA}.

CBRA Association Configuration

The RMSI or UE-specific configuration also configures an association (mapping) between the actually transmitted SS/PBCH blocks (SSBs) and subsets of the PRACH occasions and/or subsets of preamble indices within those PRACH occasions. The association is used by a UE to select a PRACH occasion and a preamble index. The UE first selects an SSB based on SSB measurement, e.g. SSB reference signal received power (RSRP). Based on the selected SSB the UE can select a PRACH occasion and preamble index from the subset of PRACH occasions and/or subset of PRACH preamble indices associated with the selected SSB. In some embodiments, the associations between the SSBs and the PRACH occasions are consecutively repeated within some long time period T2. For example, in the case of one-to-one SSB to PRACH occasions association, if there are 2 SSBs and 100 PRACH occasions within T2, then the associations are consecutively repeated 50 times with T2.

In some embodiments, the number of PRACH occasions in T2 is not divisible by the number of actually transmitted SSBs. The association period T2 is preferably large to avoid too frequent truncation, e.g. P or a multiple of P or a multiple of T1. Truncation occurs for example when one-to-one association is configured between 7 SSBs and 100 PRACH occasions in T2. Then, the associations are repeated 14 times (to 98 PRACH occasions), leaving two PRACH occasions in T2. These two are either associated with some SSBs, e.g. SSB0 and SSB1, or not configured for PRACH in this configuration, in various embodiments. If associated with SSB0 and SSB1, these two SSBs will have slightly more PRACH resources. In some embodiments, the number of subsets of preamble indices in the PRACH occasions in T2 is not divisible by the number of actually transmitted SSBs. For example, truncation occurs when many-to-one association is configured between 7 SSBs and 100 PRACH occasions in T2, and that each PRACH occasion has two subsets of preamble indices. This means that two SSBs are associated with different subsets of preamble indices in one PRACH occasion. Then, the associations are repeated 28 times (to 98 PRACH occasions), leaving two PRACH occasions in T2. These two are either associated with some SSBs, e.g. SSB0 and SSB1, or not configured for PRACH in this configuration, in various embodiments.

After one T2, the association restarts by consecutively associating SSB0, SSB1, etc. to the PRACH occasions in the following T2.

CFRA Resource Configuration

CFRA can be configured to UEs with UE-specific signaling, for example in an RRC configuration or reconfiguration or in a handover command. CFRA can also be configured in a system information block (SIB), for example CFRA for other SI (OSI, e.g. SIB2 or higher) on-demand delivery request, DL beam reporting for paging or other reasons. Any UE configured with CFRA will also typically be aware of a configuration for CBRA, for example the CBRA configuration in RMSI or SIB1. Also in CFRA for HO, the target cell CBRA configuration will typically be included in the configuration in the handover command. Hence, it is important to consider the co-existence between CBRA and CFRA PRACH occasions (also called CBRA occasions and CFRA occasions, or CBRA/CFRA communication opportunities).

Various embodiments in which CFRA occasions co-exist with CBRA occasions are considered, and three cases, and their utility, are highlighted in view of embodiments of the disclosed technology.

Option 1: Overlapping PRACH occasions (as LTE): In this case, CFRA may use the same PRACH occasions as CBRA, which may result in CFRA using dedicated preamble indices not assigned to CBRA. This seems to be the most efficient in terms of minimizing CBRA latency, since more CBRA occasions are configured. Since more CBRA occasions are configured, the set of CBRA preambles per CBRA occasion can be smaller, thereby leaving more room for CFRA. This option typically relies on that both CBRA and CFRA use the same RS for association, i.e. the actually transmitted SSBs.

Option 2: Non-overlapping PRACH occasions: In this case, CFRA may use different PRACH occasions than CBRA, which results in CFRA being able to use any preamble indices, even though they may have been assigned to CBRA. This option may be used in some embodiments in which CFRA is based on CSI-RS, for example when analog/hybrid beamforming is used at the gNB.

Option 3: Partly overlapping PRACH occasions: In this case, CFRA may use both the PRACH occasions configured for CBRA (that are also among the PRACH occasions for CFRA, i.e. overlapping) and other (dedicated, i.e. non-overlapping) PRACH occasions. At least in the PRACH occasions shared with CFRA, the CFRA may use dedicated preamble indices not assigned to CBRA. In the other PRACH occasions, CFRA may use any preamble indices. This scenario may be useful when many CFRA resources are needed, in addition to the PRACH occasions shared with CBRA.

Various embodiments to support Option 1, 2 and 3, and some of these embodiments are discussed in the following. A UE configured with CFRA may be optionally configured with a PRACH occasion configuration using the same parameters as for CBRA, e.g. it is optionally configured with RO_CFRA. For example, if the configuration follows the framework described above, the CFRA configuration could include:

(i)   RO_CFRA={PRACH_burst_config_CFRA, N_CFRA, D_CFRA, P_CFRA}, or
(ii)  RO_CFRA={PRACH_burst_config_CFRA, PRACH_burst_pattern_CFRA}, or
(iii) RO_CFRA={PRACH_burst_config_CFRA, PRACH_burst_pattern_CFRA, P_CFRA}.

Option 1 may be applied if the RO_CFRA is not configured.

Option 2 may be applied if the CFRA occasions are configured to be different from the CBRA occasions, and can be configured by selecting a RO_CBRA and RO_CFRA with non-overlapping PRACH occasions. For example, by selecting a PRACH_burst_pattern_CFRA that configures a pattern within T1 that does not overlap with the pattern defined by PRACH_burst_pattern_CBRA, or by selecting a different offset D, or by other parameter configurations.

Option 3 may be applied in partly overlapping CFRA and CBRA occasions, and may be configured by selecting RO_CBRA and RO_CFRA with partly overlapping PRACH occasions. For example, by selecting the same configuration except a different PRACH_burst_pattern_CFRA with partly overlapping PRACH occasions, or by selecting the same pattern as PRACH_burst_pattern_CBRA, but configuring partly overlapping frequency multiplexed PRACH occasions e.g. by configuring a different (e.g. larger) number of frequency multiplexed PRACH occasions and/or a different frequency offset.

Figure 3:
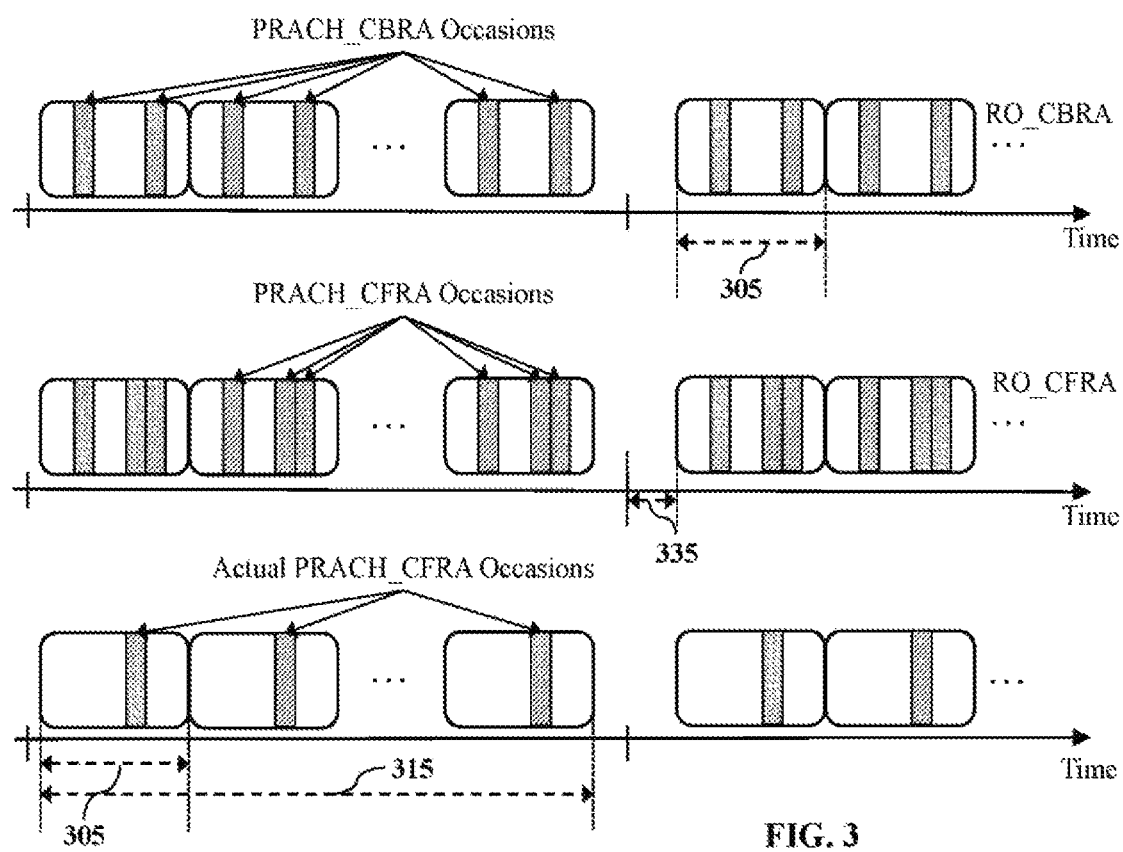
FIG. 3 shows examples of actual PRACH opportunities for CFRA based on a shared configuration framework between CBRA and CFRA, in accordance with some embodiments of the presently disclosed technology.

In an example described in the context of FIG. 3, it may not be easy to select a PRACH_burst_pattern, D or other parameter to provide completely non-overlapping PRACH occasions. In order to provide high flexibility to provide non-overlapping PRACH occasions for CFRA, a very flexible PRACH_burst_pattern configuration may be required, which may require many configuration bits for RO_CFRA, for example. In various embodiments, PRACH occasions for CFRA are defined as those configured by RO_CFRA, but not in RO_CBRA. The set of CFRA occasions is the set difference between RO_CFRA and RO_CBRA.

FIG. 3 shows the definition of actual PRACH opportunities for CFRA based on a shared configuration framework between CBRA and CFRA, in accordance with some embodiments of the presently disclosed technology. The upper portion of FIG. 3 shows the PRACH_CBRA occasions, in a PRACH_CBRA burst (305), given the CBRA configuration (RO_CBRA). Similarly, the middle portion shows the PRACH_CFRA occasions given the CBRA configuration (RO_CFRA). The lower portion shows the actual PRACH_CFRA occasions, which are the difference between the PRACH_CBRA and PRACH_CFRA occasions. In other words, those PRACH_CFRA occasions in the CFRA schedule/configuration that are not part of the PRACH_CBRA occasions.

In order to support the three options discussed above, some embodiments include a configuration that indicates whether RO_CFRA (the middle portion of FIG. 3) defines the actual CFRA occasions, or whether the set difference between RO_CBRA and RO_CFRA (the lower portion of FIG. 3) should be used. In various embodiments, the indication is included in the CFRA configuration in RRC configuration, reconfiguration and/or handover command. In various embodiments, the indication is one explicit bit. In some embodiments, the bit is implicitly indicated.

In various embodiments, a CFRA configuration indicates which of the two alternatives below that defines the actual (or valid, or allowed) PRACH occasions for CFRA.

Alternative (a) (or Alt-a): The PRACH occasions configured in the CFRA configuration (regardless of overlap with PRACH occasions for CBRA), or Alternative (b) (or Alt-b): The difference between the PRACH occasions configured in the CFRA configuration and the PRACH occasions configured for CBRA, which results in the actual PRACH occasions for CFRA being the PRACH occasions configured in the CFRA, but not configured in the CBRA configuration.

The "PRACH occasions configured in the CFRA configuration" above may include the configuration by RO_CFRA, PRACH config index, PRACH_burst_pattern_CFRA, etc., as discussed above, in various embodiments. The "actual PRACH occasions for CFRA" are the PRACH occasions actually used for CFRA and may also be used for CFRA association. The "actual PRACH occasions for CFRA" may be different from the PRACH occasions configured in the CFRA configuration, e.g. in Alt-b) above, since the PRACH occasions already configured for CBRA may not actually be used for CFRA, in this case.

In various embodiments, Alt-a) results in Option 3 (partly overlapping). In various embodiments, Alt-b) results in Option 2). In some embodiments, in the case CFRA is based on CSI-RS, it might be required to use only Alt-b). In some embodiments in which CFRA is based on CSI-RS, an explicit indication bit can be omitted from the configuration since Alt-b is used. In some embodiments, the indication is implicit such that if CFRA is based on SSB, then Alt-a) is used, and else if CFRA is based on CSI-RS, e.g. if a configuration of CSI-RS provided in a handover command or if an indication that CSI-RS should be used for RACH resource/preamble index association, then Alt-b) is used. In some embodiments, the indication bit is optional and only included in the configuration if the CFRA is based on SSB.

In some embodiments, a CFRA configuration includes an optional configuration of PRACH, with one or more parameters that are also included in a CBRA configuration, such as one or more of those enumerated in [024-038]. In some embodiments, the absence of such an optional configuration indicates the use of Alt-a) and the presence of such an optional configuration indicates the use of Alt-b). In some embodiments, a CFRA configuration includes a dedicated configuration of High Speed Flag and/or Root sequence index and/or other parameters. In such a CFRA configuration, the High Speed Flag and/or Root sequence index, etc. is different from the CBRA configuration, and it may be necessary to use Alt-b). In such cases, the indication could be omitted from the configuration, as for CSI-RS in some embodiments.

In various embodiments, a CFRA resource configuration includes one or more "mask" configurations, e.g. in the form of one or more mask index that select one out a larger set of predefined masks. In some embodiments, a mask is in the form of a bitmap. In some embodiments, a mask is in the form of rule, formula or method, with some configurable parameters.

In some embodiments, a mask selects some configured CFRA PRACH occasions, e.g. according to RO_CFRA, as actual PRACH occasions. In some embodiments, a mask selects some configured CBRA PRACH occasions, e.g. according to RO_CBRA, as actual CBRA PRACH occasions. In some embodiments, a mask is defined for a smaller set of (CFRA and/or CBRA) PRACH occasions, e.g. smaller than T1, and in some embodiments it's defined for (CFRA and/or CBRA) PRACH occasions in T1. In some embodiments, a defined mask is then applied to other times periods by repeating the defined mask in time. In some embodiments, a mask is defined for one frequency multiplexed (CFRA and/or CBRA) PRACH occasion pattern. In some embodiments, a defined mask is then applied to all configured frequency multiplexed (CFRA and/or CBRA) PRACH occasions.

In other embodiments, a mask selects CFRA PRACH occasions after the difference between configured CFRA occasions and configured CBRA occasions have been taken. In other words, the "actual" CFRA PRACH occasions is generated twice, first by taking the difference with CBRA PRACH occasions, and second by applying the mask.

In effect, one or more masks is defined and applied to the configure CBRA PRACH occasions and/or the configured CFRA PRACH occasions and/or the "actual" CFRA PRACH occasions obtained after taking the difference between the configured CFRA and CBRA PRACH occasions. Note that the same or different mask(s) is/are applied to the different PRACH occasion patterns described above.

CFRA Association Configuration

In some embodiments covered by Option 1, the associations between SSBs and PRACH occasions are largely shared between CBRA and CFRA. CFRA may additionally require a preamble index offset parameter, that indicates which of the preambles not assigned to CBRA that is (are) assigned to the UE for CFRA. In other embodiments, a subset of PRACH occasions/preambles for both CBRA and CFRA are configured in the CBRA association configuration. In such embodiments, the CFRA configuration may include a preamble index offset parameter that indicates the preamble index within the preamble sub-subset associated with CFRA for a particular SSB.

In various embodiments of Option 2 (only dedicated CFRA occasions), a dedicated CFRA association is configured. For example, there may be a different number of CSI-RS (for CFRA) than SSBs (for CBRA), which means that the association configuration parameters need to be different. However, the same framework could be applied (e.g. with 0 CBRA preambles configured).

For embodiments covered by Option 3 (partly shared CBRA/CFRA occasions), the association configuration from CBRA in CFRA is re-used, as in Option 1. However, the associations from SSBs to PRACH occasions in CBRA are consecutive only over the CBRA occasions. Therefore, in some embodiments, there is a separate consecutive association from SSBs to the set of dedicated CFRA occasions, in order not to disturb the CBRA association.

Figure 4:
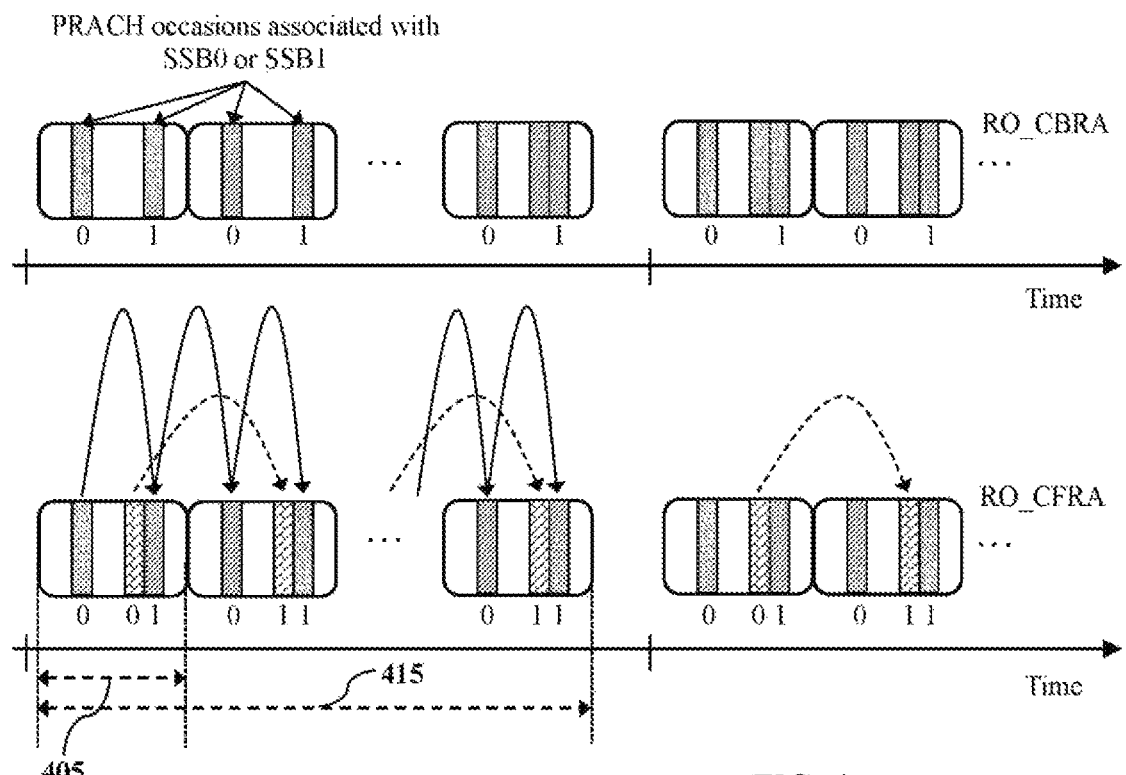
FIG. 4 shows the configuration of associations for CBRA and CFRA when there is a partial overlap between the two types of communication opportunities, in accordance with some embodiments of the presently disclosed technology.

FIG. 4 shows the configuration of associations for CBRA and CFRA when there is a partial overlap between the two types of communication opportunities, in accordance with some embodiments of the presently disclosed technology, and is an example of embodiments covered by Option 3, as described above. The "0" and "1" labels below the PRACH occasions in FIG. 4 denote the associated SSB, and demonstrate the consecutive association from SSBs to the set of dedicated CFRA occasions (with brick hatching in the lower portion of FIG. 4), which stand independently from the CBRA association (with diagonal hatching).

However, the preamble(s) assigned to CFRA may be the same in the CBRA and CFRA occasions in Option 3. The set of preambles assigned to CBRA in CBRA occasions may be assigned to other UEs in CFRA occasions using Option 2. In this way, all PRACH resources (time, frequency, sequence) can be used. In various embodiments, the truncation is separate in the CBRA association and in the CFRA association, e.g. if the consecutive association is performed separately.

In various embodiments, a CFRA resource configuration includes one or more "mask" configurations, e.g. in the form of one or more mask index that select one out a larger set of predefined masks. In some embodiments, a mask is in the form of a bitmap. In some embodiments, a mask is in the form of rule, formula or method, with or without some configurable parameters in some embodiments. For example, even or odd PRACH occasions can be masked. In some embodiments, a specific mask value does not limit the PRACH occasions but all are valid.

In some embodiments, a mask selects some SSBs. In some embodiments, a mask selects some CSI-RS. In some embodiments, a mask selects some SSB out or all possible SSBs defined for the frequency band. In some embodiments, a mask selects some out of a configured set of actually transmitted SSBs, e.g. as configured in RMSI. In various embodiments, the selected SSB or CSI-RS are considered as valid SSBs or CSI-RS in subsequent definition, generation or configuration of association between SSBs/CSI-RS and subsets of PRACH occasions and/or subsets of preamble indices. In various embodiments, SSB/CSI-RS masking is applied to the definition or generation of the SSB/CSI-RS to CFRA PRACH occasion association before the CFRA PRACH occasion and CBRA PRACH occasion difference is performed. In various embodiments, SSB/CSI-RS masking is applied to the definition or generation of the SSB/CSI-RS to CFRA PRACH occasion association after the CFRA PRACH occasion and CBRA PRACH occasion difference is performed.

Methods and Systems for CBRA and CFRA Co-Existence

Figure 5:
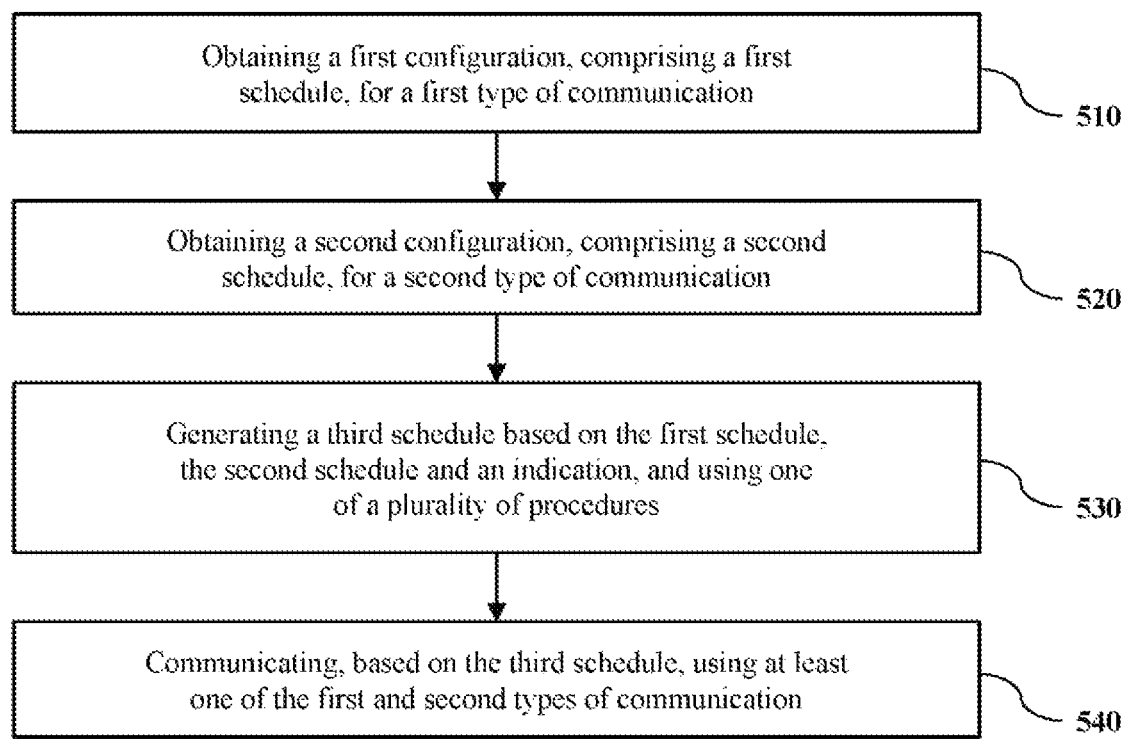
FIG. 5 shows an example of a first method for the co-existence of CBRA and CFRA resources and associations, in accordance with some embodiments of the presently disclosed technology.

FIG. 5 shows an example of a first wireless communication method that can be implemented at a UE, in accordance with some embodiments of the presently disclosed technology. The method begins at step 510, wherein the UE obtains a first configuration for a first type of communication, with the first configuration comprising a first schedule. At step 520, the UE obtains a second configuration for a second type of communication, with the second configuration comprising a second schedule. In some embodiments, the second configuration further comprises an indication, which is used to determine how the third schedule is generated based on the first and second schedules.

In an embodiment, the first and second configurations correspond to RO_CBRA and RO_CFRA, respectively. As detailed above, each of these configurations comprise a list of PRACH occasions for the respective type of communication, e.g. PRACH_CBRA and PRACH_CFRA occasions, respectively.

At step 530, a third schedule is generated based on the first and second schedules and the indication. In some embodiment, and as detailed above, the indication may be an explicit bit, the presence or absence of a flag or an index, or the equality of one or more parameters in each of the two received configurations, and is used to select between a plurality of procedures. In an embodiment, the indication selects between a first procedure and a second procedure. In an example, the first and second procedures may correspond to Alt-a) and Alt-b) described above.

At step 540, the UE may communicate based on the third schedule using at least one of the first and second types of communication. In an embodiment, the UE can now execute contention based random access or contention free random access, or a combination of both, based on how the third schedule was generated.

Figure 6:
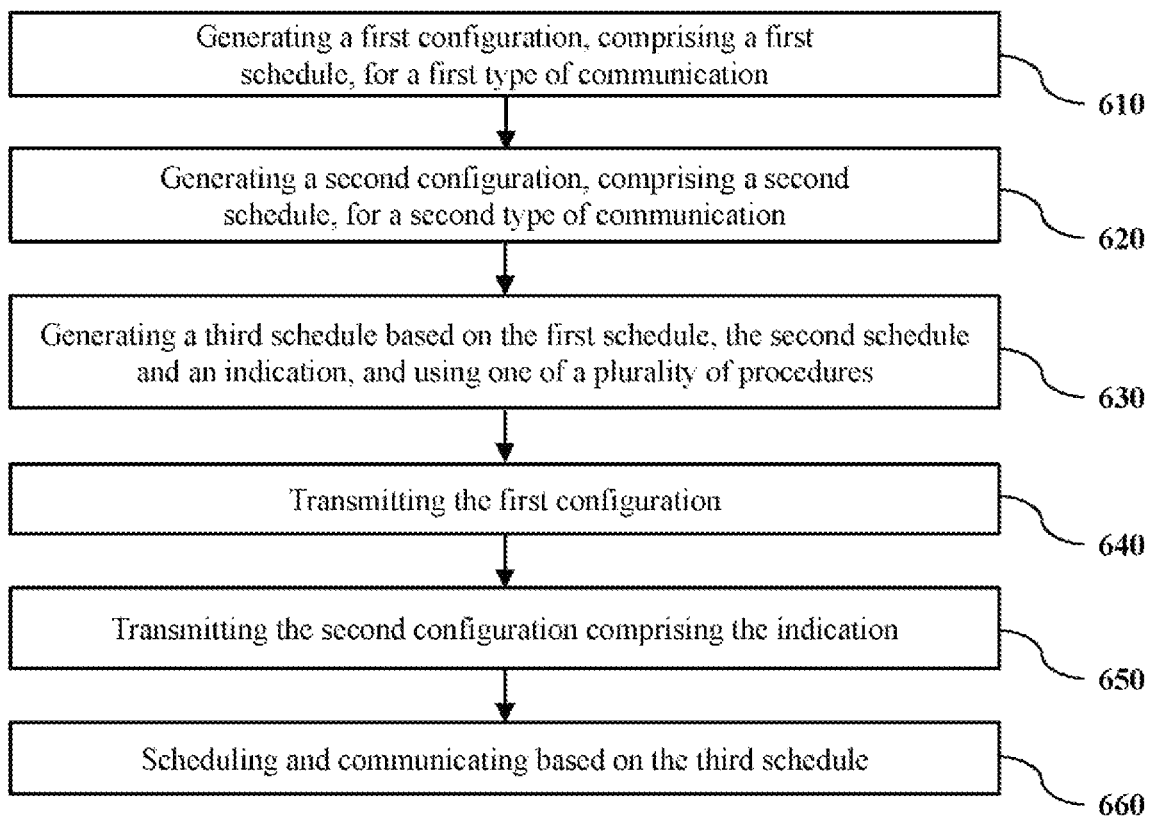
FIG. 6 shows an example of a second method for co-existence of CBRA and CFRA resources and associations, in accordance with some embodiments of the presently disclosed technology.

FIG. 6 shows an example of a second wireless communication method that can be implemented at a base station, in accordance with some embodiments of the presently disclosed technology. The method begins at step 610, when the base station generates a first configuration for a first type of communication, with the first configuration comprising a first schedule. At step 620, the base station generates a second configuration for a second type of communication, with the second configuration comprising a second schedule.

At step 630, a third schedule is generated based on the first and second schedules, and an indication that indicates which of a plurality of procedures to employ to generate the third schedule. At steps 640 and 650, the first and second configurations are transmitted to the UEs in the coverage area of the base station, respectively. In some embodiments, the indication is transmitted as part of the second configuration.

At step 660, the base station can schedule and communicate based on the third schedule that was generated. For example, the base station may perform PRACH detection and other procedures that result in standard-compliant and successful random access procedures being completed and subsequent data communication being performed.

Figure 7:
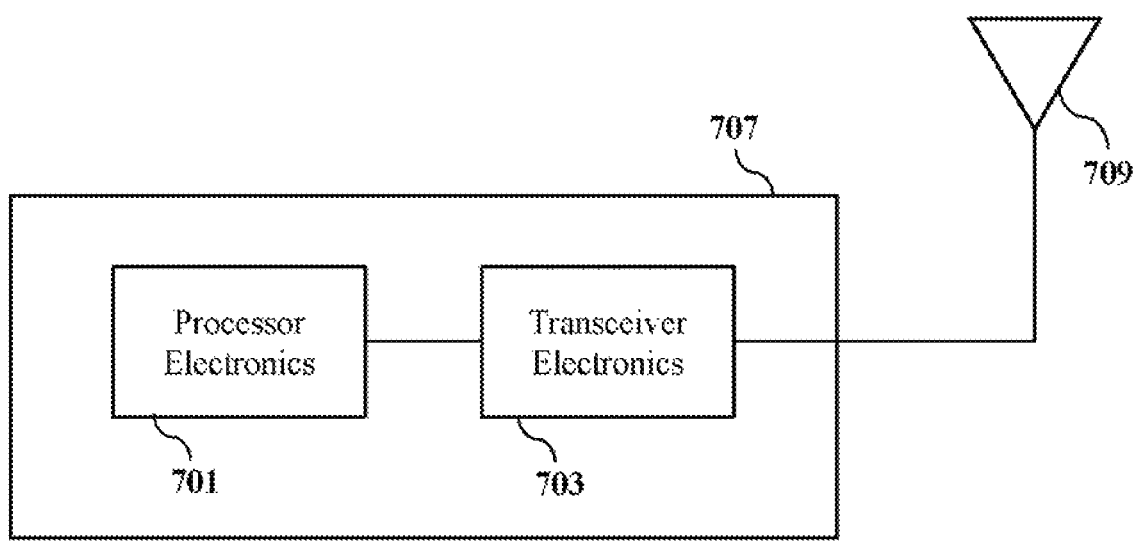
FIG. 7 is a block diagram representation of a portion of a radio station, in accordance with some embodiments of the presently disclosed technology.

FIG. 7 is a block diagram representation of a portion of a radio station, in accordance with some embodiments of the presently disclosed technology. A radio station 707, such as a base station or a wireless device (or UE), can include processor electronics 701 such as a microprocessor that implements one or more of the techniques presented in this document. The radio station 707 can include transceiver electronics 703 to send and/or receive wireless signals over one or more communication interfaces such as antenna(s) 709. The radio station 707 can include other communication interfaces for transmitting and receiving data. Radio station 707 can include one or more memories (not explicitly shown) configured to store information such as data and/or instructions. In some implementations, the processor electronics 701 can include at least a portion of the transceiver electronics 703. In some embodiments, at least some of the disclosed techniques, modules or functions are implemented using the radio station 707.

The term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

The invention claimed is:

1. A wireless communication method, comprising:
obtaining a first configuration for a first type of communication, wherein the first configuration comprises a first schedule, wherein the first schedule comprises a first plurality of communication opportunities within a time duration $T_1$;
obtaining a second configuration for a second type of communication, wherein the second configuration comprises a second schedule and an indication, wherein the second schedule comprises a second plurality of communication opportunities within the time duration $T_1$;
identifying a third plurality of communication opportunities within the time duration $T_1$, wherein each of the third plurality of communication opportunities are present in both the first and second plurality of communication opportunities;
identifying a fourth plurality of communication opportunities with the time duration $T_1$, wherein each of the fourth plurality of communication opportunities are absent in the first plurality of communication opportunities and present in the second plurality of communication opportunities;
generating a third schedule based on the first schedule and the second schedule using one of a plurality of procedures, wherein the one of the plurality of procedures is selected based on the indication; and
communicating, based on the third schedule, using at least one of the first and second types of communication.

2. The method of claim 1, wherein communicating comprises performing random access over a wireless channel.

3. The method of claim 2, wherein the first type of communication comprises contention based random access (CBRA), and wherein the second type of communication comprises contention free random access (CFRA).

4. The method of claim 1, wherein the plurality of procedures comprises at least a first procedure and a second procedure.

5. The method of claim 4, wherein the first procedure comprises:
configuring the third schedule to include the first plurality of communication opportunities and the second plurality of communication opportunities;
assigning indices from a first set of indices to each of the first plurality of communication opportunities for the first type of communication;
assigning indices from a second set of indices to each of the third plurality of communication opportunities for the second type of communication; and
assigning indices from the first set of indices to each of the fourth plurality of communication opportunities for the second type of communication.

6. The method of claim 5, wherein assigning an index to one communication opportunity of the first plurality of communication opportunities for the first type of communication comprises:
using a preamble with the assigned index when communicating using the first type of communication in the one communication opportunity.

7. The method of claim 5, wherein each of the first set of indices are distinct from each of the second set of indices, and wherein indices are assigned without replacement.

8. The method of claim 5, wherein the first procedure or the second procedure further comprises:
applying a mask to the configured third schedule, wherein the second configuration comprises the mask, and wherein applying the mask to the third schedule comprises removing one or more communication opportunities from the third schedule.

9. The method of claim 4, wherein the second procedure comprises:
configuring the third schedule to include the first plurality of communication opportunities and the fourth plurality of communication opportunities;
assigning indices from a first set of indices to each of the first plurality of communication opportunities for the first type of communication; and
assigning indices from the first set of indices to each of the fourth plurality of communication opportunities for the second type of communication.

10. The method of claim 4, wherein the indication comprises a bit, wherein the first procedure is used when the bit is zero, and wherein the second procedure is used when the bit is one.

11. The method of claim 4, wherein the indication comprises the presence of at least one of a flag or an index in the second configuration, wherein the first procedure is used when the at least one of the flag or the index is present, and wherein the second procedure is used when the at least one of the flag or the index is absent.

12. The method of claim 4, wherein the indication is a comparison of a value of at least one parameter in the first configuration and the value of the at least one parameter in the second configuration, wherein the first procedure is used when the value of the at least one parameter in the first configuration is equal to the value of the at least one parameter in the second configuration, and wherein the second procedure is used when the value of the at least one parameter in the first configuration is not equal to the value of the at least one parameter in the second configuration.

13. The method of claim 1, wherein the second configuration further comprises a mask, and wherein generating the third schedule is further based on the mask.

14. The method of claim 1, wherein the third schedule comprises at least one of the third plurality of communication opportunities or at least one of the fourth plurality of communication opportunities.

15. A wireless communication method, comprising:
generating a first configuration for a first type of communication, wherein the first configuration comprises a first schedule, wherein the first schedule comprises a first plurality of communication opportunities within a time duration $T_1$;
generating a second configuration for a second type of communication, wherein the second configuration comprises a second schedule and an indication, wherein the second schedule comprises a second plurality of communication opportunities within the time duration $T_1$;
identifying a third plurality of communication opportunities within the time duration $T_1$, wherein each of the third plurality of communication opportunities are present in both the first and second plurality of communication opportunities;
identifying a fourth plurality of communication opportunities with the time duration $T_1$, wherein each of the fourth plurality of communication opportunities are absent in the first plurality of communication opportunities and present in the second plurality of communication opportunities;
generating a third schedule based on the first schedule and the second schedule using one of a plurality of procedures, wherein the one of the plurality of procedures is selected based on the indication;
transmitting the first configuration;
transmitting the second configuration comprising the indication; and
scheduling and communicating based on the third schedule.

16. The method of claim 15, wherein the first type of communication comprises contention based random access (CBRA), and wherein the second type of communication comprises contention free random access (CFRA).

17. The method of claim 15, wherein the plurality of procedures comprises at least a first procedure and a second procedure.

18. The method of claim 17, wherein the first procedure comprises:
configuring the third schedule to include the first plurality of communication opportunities and the second plurality of communication opportunities;
assigning indices from a first set of indices to each of the first plurality of communication opportunities for the first type of communication;
assigning indices from a second set of indices to each of the third plurality of communication opportunities for the second type of communication; and
assigning indices from the first set of indices to each of the fourth plurality of communication opportunities for the second type of communication.

19. The method of claim 18, wherein assigning an index to one communication opportunity of the first plurality of communication opportunities for the first type of communication comprises:
using a preamble with the assigned index when communicating using the first type of communication in the one communication opportunity.

20. The method of claim 18, wherein each of the first set of indices are distinct from each of the second set of indices, and wherein indices are assigned without replacement.

21. The method of claim 17, wherein the second procedure comprises:
configuring the third schedule to include the first plurality of communication opportunities and the fourth plurality of communication opportunities;
assigning indices from a first set of indices to each of the first plurality of communication opportunities for the first type of communication; and
assigning indices from the first set of indices to each of the fourth plurality of communication opportunities for the second type of communication.

22. The method of claim 17, wherein the indication comprises a bit, wherein the first procedure is used when the bit is zero, and wherein the second procedure is used when the bit is one.

23. The method of claim 17, wherein the indication comprises the presence of at least one of a flag or an index in the second configuration, wherein the first procedure is used when the at least one of the flag or the index is present, and wherein the second procedure is used when the at least one of the flag or the index is absent.

24. The method of claim 17, wherein the indication is a comparison of a value of at least one parameter in the first configuration and the value of the at least one parameter in the second configuration, wherein the first procedure is used when the value of the at least one parameter in the first configuration is equal to the value of the at least one parameter in the second configuration, and wherein the second procedure is used when the value of the at least one parameter in the first configuration is not equal to the value of the at least one parameter in the second configuration.

25. The method of claim 15, wherein the third schedule comprises at least one of the third plurality of communication opportunities or at least one of the fourth plurality of communication opportunities.

26. A wireless communication apparatus, comprising:
a processor configured to implement a method that includes:
obtain a first configuration for a first type of communication, wherein the first configuration comprises a first schedule, wherein the first schedule comprises a first plurality of communication opportunities within a time duration $T_1$;
obtain a second configuration for a second type of communication, wherein the second configuration comprises a second schedule and an indication, wherein the second schedule comprises a second plurality of communication opportunities within the time duration $T_1$;
identify a third plurality of communication opportunities within the time duration $T_1$, wherein each of the third plurality of communication opportunities are present in both the first and second plurality of communication opportunities;
identify a fourth plurality of communication opportunities with the time duration $T_1$, wherein each of the fourth plurality of communication opportunities are absent in the first plurality of communication opportunities and present in the second plurality of communication opportunities;
generate a third schedule based on the first schedule and the second schedule using one of a plurality of procedures, wherein the one of the plurality of procedures is selected based on the indication; and
communicate, based on the third schedule, using at least one of the first and second types of communication.

27. The wireless communication apparatus of claim 26, wherein the third schedule comprises at least one of the third plurality of communication opportunities or at least one of the fourth plurality of communication opportunities.

28. The wireless communication apparatus of claim 26, wherein the first type of communication comprises contention based random access (CBRA), and wherein the second type of communication comprises contention free random access (CFRA).

29. A wireless communication apparatus, comprising:
a processor configured to implement a method that includes:
generate a first configuration for a first type of communication, wherein the first configuration comprises a first schedule, wherein the first schedule comprises a first plurality of communication opportunities within a time duration $T_1$;
generate a second configuration for a second type of communication, wherein the second configuration comprises a second schedule and an indication, wherein the second schedule comprises a second plurality of communication opportunities within the time duration $T_1$;
identify a third plurality of communication opportunities within the time duration $T_1$, wherein each of the third plurality of communication opportunities are present in both the first and second plurality of communication opportunities;
identify a fourth plurality of communication opportunities with the time duration $T_1$, wherein each of the fourth plurality of communication opportunities are absent in the first plurality of communication opportunities and present in the second plurality of communication opportunities;

generate a third schedule based on the first schedule and the second schedule using one of a plurality of procedures, wherein the one of the plurality of procedures is selected based on the indication;

transmit the first configuration;

transmit the second configuration comprising the indication; and schedule and communicating based on the third schedule.

30. The wireless communication apparatus of claim 29, wherein the third schedule comprises at least one of the third plurality of communication opportunities or at least one of the fourth plurality of communication opportunities.

31. The wireless communication apparatus of claim 29, wherein the first type of communication comprises contention based random access (CBRA), and wherein the second type of communication comprises contention free random access (CFRA).

* * * * *

UNITED STATES PATENT AND TRADEMARK OFFICE
CERTIFICATE OF CORRECTION

PATENT NO. : 11,324,053 B2
APPLICATION NO. : 16/766663
DATED : May 3, 2022
INVENTOR(S) : Patrick Svedman et al.

It is certified that error appears in the above-identified patent and that said Letters Patent is hereby corrected as shown below:

On the Title Page

In Item (57), under "Abstract", in Column 2, Line 7, delete "schedule" and insert -- schedule. --, therefor.

In the Specification

In Column 3, Line 35, delete "A PRACH slot" and insert the same at Line 36, before "describes" as a new paragraph.

In Column 5, Line 14, delete "the" and insert -- of the --, therefor.

In Column 7, Line 14, delete "to support" and insert -- support --, therefor.

In Column 8, Line 5, delete "that are" and insert -- are --, therefor.

In Column 8, Line 44, delete "Option 2)." and insert -- Option 2. --, therefor.

In Column 9, Line 6, delete "a" and insert -- of a --, therefor.

In Column 9, Line 34, delete "configure" and insert -- configured --, therefor.

In Column 10, Line 24, delete "a" and insert -- of a --, therefor.

Signed and Sealed this
Thirteenth Day of September, 2022

Katherine Kelly Vidal
*Director of the United States Patent and Trademark Office*